(12) United States Patent
Hodzic et al.

(10) Patent No.: US 8,677,142 B2
(45) Date of Patent: *Mar. 18, 2014

(54) METHOD AND SYSTEM FOR PROTECTING AGAINST THE EXECUTION OF UNAUTHORIZED SOFTWARE

(75) Inventors: Edin Hodzic, Pleasanton, CA (US); Andrew M. Goodman, Portola Valley, CA (US); Prasanna Ganesan, Menlo Park, CA (US)

(73) Assignee: Vudu, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/538,430

(22) Filed: Jun. 29, 2012

(65) Prior Publication Data

US 2012/0272296 A1    Oct. 25, 2012

Related U.S. Application Data

(63) Continuation of application No. 11/413,392, filed on Apr. 27, 2006, now Pat. No. 8,239,686.

(51) Int. Cl.
*G06F 12/14* (2006.01)

(52) U.S. Cl.
USPC ............................................. 713/187

(58) Field of Classification Search
USPC ......... 713/187–189, 193, 164–167, 176, 180, 713/181; 726/22, 26, 27, 30; 717/126, 127, 717/129, 131
See application file for complete search history.

(56) References Cited

U.S. PATENT DOCUMENTS

| | | | | |
|---|---|---|---|---|
| 5,509,120 A * | 4/1996 | Merkin et al. | ................... | 726/24 |
| 6,625,729 B1 * | 9/2003 | Angelo et al. | ..................... | 713/2 |
| 6,993,132 B2 * | 1/2006 | Khandelwal et al. | ......... | 380/232 |
| 7,003,672 B2 * | 2/2006 | Angelo et al. | ................ | 713/189 |
| 7,168,065 B1 * | 1/2007 | Naccache et al. | ............. | 717/127 |
| 7,228,432 B2 * | 6/2007 | Angelo et al. | ................ | 713/182 |
| 7,380,276 B2 * | 5/2008 | Saha et al. | ....................... | 726/22 |
| 2003/0084298 A1 * | 5/2003 | Messerges et al. | ........... | 713/176 |
| 2003/0120923 A1 * | 6/2003 | Gilman et al. | ................ | 713/170 |
| 2004/0093507 A1 * | 5/2004 | Courcambeck et al. | ...... | 713/193 |
| 2007/0016832 A1 * | 1/2007 | Weiss | ............................ | 714/100 |
| 2008/0267406 A1 * | 10/2008 | Asokan et al. | ................ | 380/277 |

* cited by examiner

*Primary Examiner* — Nirav B Patel
(74) *Attorney, Agent, or Firm* — David R. Stevens; Stevens Law Group (57) ABSTRACT

In accordance with an embodiment of the present invention, a client device is protected against the execution of unauthorized software. The client includes a code authentication process that verifies the integrity of executable code, by generating and comparing a first hash value of the executable code with a known hash value of the original code. Furthermore, during boot-up, the client initializes a CPU exception vector table with one or more vector table entries. One or more, or all, of the vector table entries direct the CPU to execute the code authentication process prior to executing an event handler when an exception event occurs. Consequently, the code authentication process is virtually guaranteed to execute, thereby protecting against the execution of unauthorized code.

20 Claims, 7 Drawing Sheets

METHOD AND SYSTEM FOR PROTECTING AGAINST THE EXECUTION OF UNAUTHORIZED SOFTWARE

CROSS REFERENCE TO RELATED APPLICATIONS

This Application is a Continuation of U.S. patent application Ser. No. 11/413,392, filed Apr. 27, 2006 now U.S. Pat. No. 8,239,686; the aforementioned priority application being hereby incorporated by reference in its entirety for all purposes.

TECHNICAL FIELD

The present invention relates generally to protecting the integrity of a trusted client, and in particular, to a method and system for protecting against the execution of unauthorized software on a trusted client.

BACKGROUND

The Internet has shown great promise as a means for delivering digital content (e.g., video and audio content, such as television shows, movies and songs). One of the advantages of network-based digital content delivery systems is the ability to deliver digital content to users on an on-demand basis (e.g., video on demand, or VOD). However, content providers have been slow to make content available via the Internet, in large part because of security concerns. Specifically, content providers fear that, once their digital content is available on the Internet, hackers will circumvent any security mechanisms used to protect their digital content and then freely distribute the content. Consequently, system developers are continuously looking for ways to secure digital content and improve the systems by which digital content is delivered over computer networks.

One of the ways that system developers attempt to secure digital content is to develop trusted clients that cannot be modified by hackers. For example, many digital content delivery systems utilize trusted clients to access, or play, digital content. One of the ways that hackers attempt to circumvent digital content security measures is to modify the trusted client device that is used to access, or play, the digital content. In particular, hackers may attempt to modify existing software, or introduce new software, on the trusted client. Accordingly, hackers may use the modified or new software processes to analyze and/or probe the trusted client in an effort to discover encryption keys, or otherwise circumvent security measures. Consequently, it is desirable to prevent the modification, or introduction of new, executable code on a client.

SUMMARY OF THE DESCRIPTION

A method and system for protecting against the execution of unauthorized software are disclosed. According to one embodiment of the invention, a client device is protected against the execution of unauthorized software. The client includes a code authentication process that verifies the integrity of executable code, by generating and comparing a hash value of the executable code with a known hash value of the authentic executable code. Furthermore, during boot-up, the client initializes a CPU exception vector table with one or more vector table entries. One or more, or all, of the vector table entries direct the CPU to execute the code authentication process prior to executing an event handler when an exception event occurs. Consequently, the code authentication process is virtually guaranteed to execute, thereby protecting against the execution of unauthorized code.

Other objects, advantages and features of the present invention will become apparent upon examining the following detailed description of an embodiment thereof, taken in conjunction with the attached drawings.

BRIEF DESCRIPTION OF THE DRAWINGS

The invention will be readily understood by reviewing the following detailed description in conjunction with the accompanying drawings, in which like references indicate similar elements and in which.

DETAILED DESCRIPTION

A method and system for protecting against the execution of unauthorized software on a trusted client are disclosed. In the following description, for purposes of explanation, numerous specific details are set forth in order to provide a thorough understanding of the present invention. It will be evident to one skilled in the art, however, that the present invention may be practiced without these specific details. The description and representation herein are the means used by those experienced or skilled in the art to effectively convey the substance of their work to others skilled in the art. In some instances, to avoid unnecessarily obscuring aspects of the present invention, well-known operations and components have not been described in detail.

Reference herein to "one embodiment" or "an embodiment" means that a particular feature, structure, operation, or other characteristic described in connection with the embodiment may be included in at least one implementation of the invention. However, the appearance of the phrase "in one embodiment" or the phrase "in an embodiment" in various places in the specification does not necessarily refer to the same embodiment.

Figure 1:
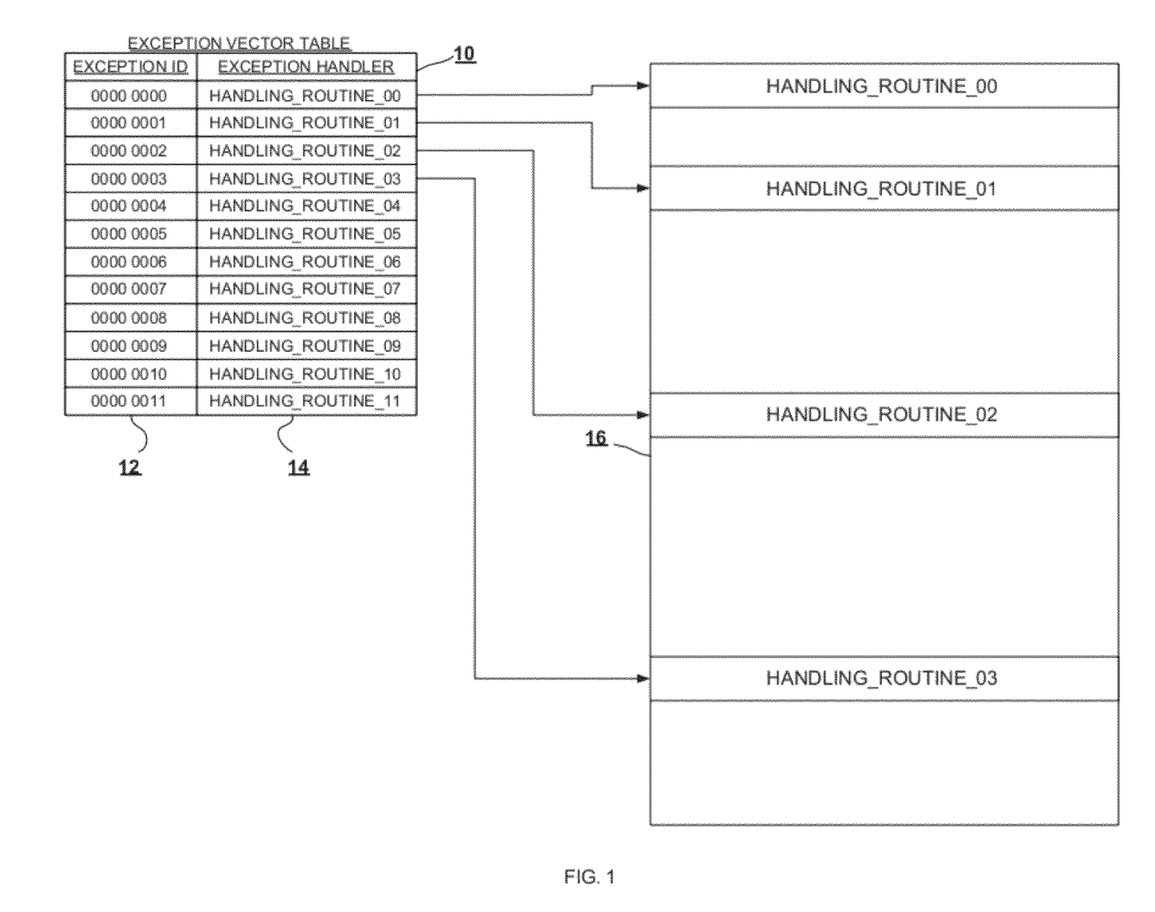
FIG. 1 illustrates a conventional CPU exception vector table.

FIG. 1 illustrates a conventional central processing unit (CPU) exception vector table 10. As illustrated in FIG. 1, the exception vector table 10 maps an exception vector identifier (ID) 12 to an exception handling routine 14. When an exception event occurs in a conventional computing system, the exception vector table 10 is referenced to determine the proper event handling routine to execute in order to process the exception event. For example, when the exception event with exception event identifier "0000 0003" occurs, the CPU executes instructions in memory 16 representing "HANDLING_ROUTINE_03." Generally, the exception vector table 10 is an essential component of the processing system.

Without it, the processing system would eventually grind to a halt as exceptions occur without proper resolution.

Figure 2:
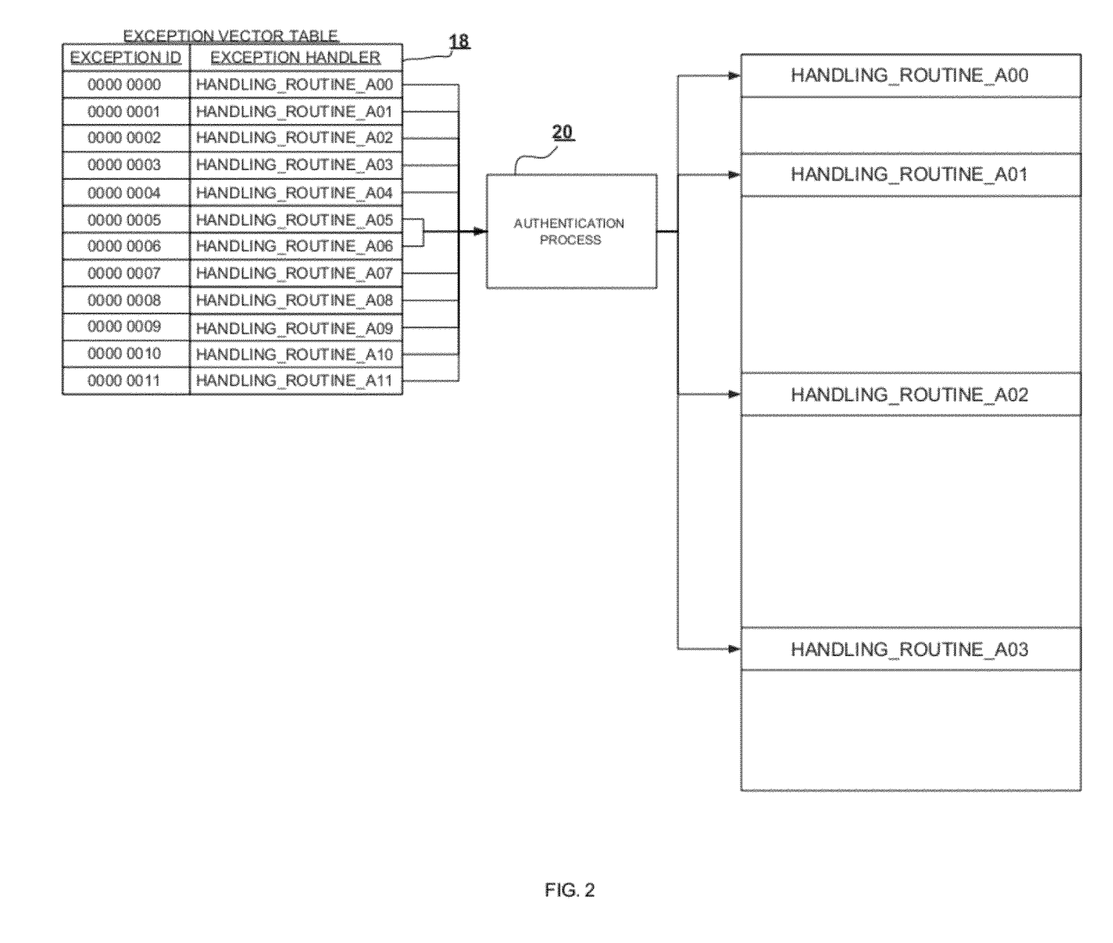
FIG. 2 illustrates a CPU exception vector table, according to an embodiment of the invention.

FIG. 2 illustrates a CPU exception vector table 18, according to an embodiment of the invention. As illustrated in FIG. 2, each entry of the exception vector table 18 causes the central processing unit (CPU) to execute a code authentication process 20 prior to executing an event handling routine associated with the particular exception vector table entry. For example, when an exception occurs, prior to executing the event handler process that is associated with the exception event, the central processing unit (CPU) first executes software instructions associated with the code authentication process 20. If, for example, the exception event ID is "0000 0003", the CPU first executes the code authentication process, and then executes the event handling routine "HAN-DLING_ROUTINE_A003". This ensures that the CPU executes the code authentication process each time an exception event occurs. As proper exception handling is critical to a normally operating client, the code authentication process is virtually guaranteed to execute as exceptions occur. This makes it difficult, if not impossible, for a hacker to disable the code authentication process.

Figure 3:
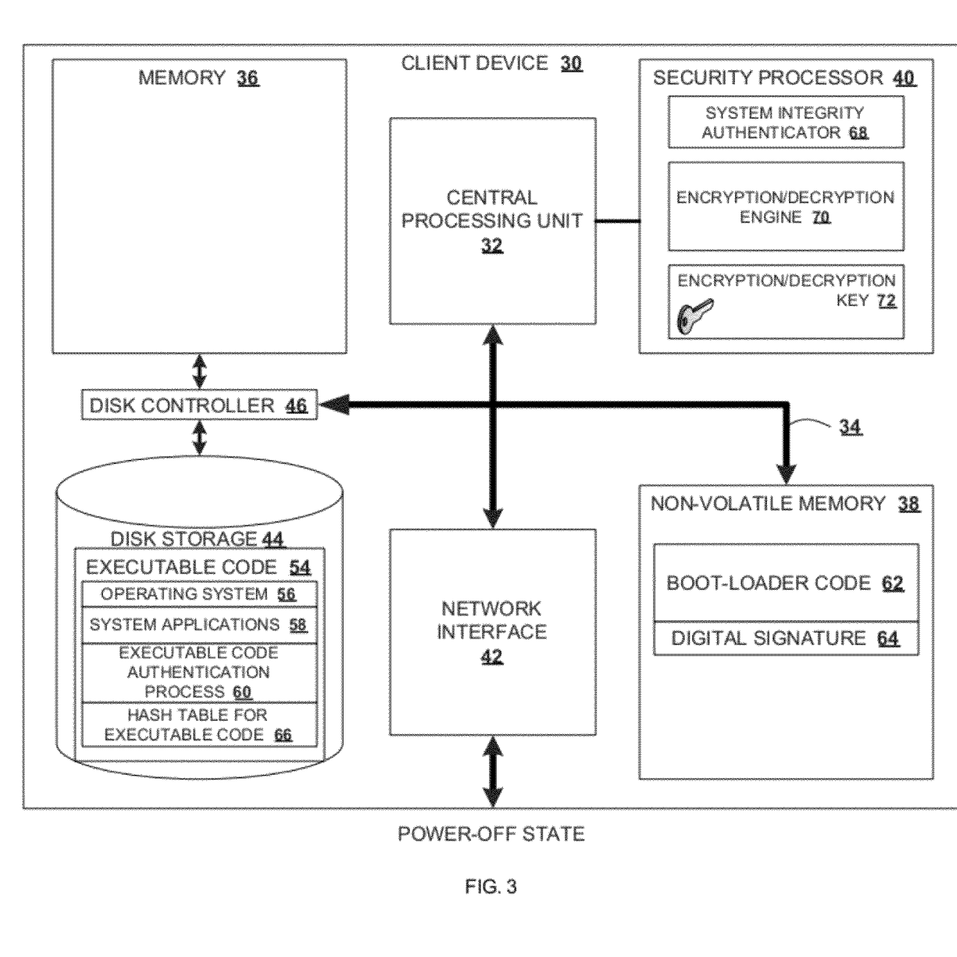
FIG. 3 illustrates a client device in a power-off state, according to one embodiment of the invention.

FIG. 3 illustrates a client device 30 in a power-off state, according to one embodiment of the invention. As illustrated in FIG. 3, the client 30 includes a central processing unit (CPU) 32, coupled by means of a system bus 34 to a memory 36, a non-volatile memory 38, a security processor (or co-processor) 40, and a network interface 42. In addition, the CPU 32 is coupled to a disk storage device 44 by means of a disk controller 46 and the system bus 34.

In one embodiment of the invention, one or more of the individual components shown in FIG. 3 may be part of a system-on-a-chip (SoC). For example, in one embodiment of the invention, the CPU 32, security processor 40, disk controller 46, memory controller (not shown), and network interface 42 may all be part of a SoC. It will be appreciated by those skilled in the art that the client device 30 may include a variety of other functional components (e.g., a display subsystem and/or an additional communication component) that are not germane to the invention, and therefore have not been included in FIG. 3.

The disk storage device 44 stores executable code 54 and a hash table for the executable code 66. In one embodiment of the invention, the executable code includes, but is not limited to the operating system 56, system applications 58, and an executable code authentication process 60. The operating system 56 may be a customized version of any conventional operating system, such as Linux or Microsoft Windows®. The system applications 58 will generally be customized applications that enable the primary functions of the client device 30, to include the play back of digital content received over the network interface 42. The executable code authentication process 60 is a set of instructions, or a process, that authenticates segments of executable code when executed by the CPU 32. As described in greater detail below, when the system powers on, segments of the executable code are read into memory to be executed by the CPU 32.

It will be appreciated by those skilled in the art that, depending on the state of the client, the executable code 54 may be a set of instructions stored on disk storage 44, or alternatively, a process stored in memory and being executed by the CPU. Furthermore, although the disk storage 44 is shown in FIG. 3 to include only executable code, it will be appreciated that a portion of disk storage may be utilized to store digital content (e.g., video and/or audio) as well.

The non-volatile memory 38 includes boot-loader code 62, and a digital signature 64 for the boot-loader code 64. The boot-loader code 62 includes boot-up instructions that are executed during a power-on procedure, which enables the client to load the operating system and enter into an operating state. As described in greater detail below, the boot-loader digital signature 64 is a mechanism used for authenticating the boot-loader code 62. Accordingly, the authentication mechanism is intended to identify non-conforming or unauthorized code before it is executed, thereby preventing hackers from modifying existing code, and/or introducing new code into the client.

In one embodiment of the invention, during production of the client 30, the executable code 54 that is to be written to the disk storage device 44 is loaded on to a production server. On the production server, the executable code 54 is analyzed, and a hash generator algorithm is utilized to generate a table 66 of hash values corresponding to segments of the executable code. Accordingly, each hash value in the hash table 66 represents a digest of a segment of executable code. Similarly, one or more hash values are generated for the boot-loader code 62. In one embodiment of the invention, the hash value for the boot-loader code is encrypted with an encryption key to generate a digital signature 64. For example, the encryption key utilized to encrypt the hash value for the boot-loader code may be shared in common with the security processor 40. Accordingly, the security processor 40, utilizing the encryption/decryption key 72, can decrypt the digital signature to access the originally generated hash for the boot-loader code 62.

During production of the client, the boot-loader code 62 and the digital signature 64, are programmed into the non-volatile memory 38. In addition, the hash table is stored in a file on the hard disk. Consequently, after production when the client is in use, the system integrity authenticator 68 can authenticate the boot-loader code 62 during a power-on, or boot-up, procedure. Similarly, after boot-up, the executable code authentication process 60 can authenticate the executable code 54 by generating a hash value with the same hash generating algorithm used on the production server. The generated hash value is then compared with the pre-calculated hash value in the hash table 66. If the hash values match, it can be presumed that the segment of executable code is authentic and original.

The security processor 40, which includes the system integrity authenticator 48, also includes an encryption/decryption engine 70 and at least one encryption/decryption key 72. Accordingly, the security processor 40 may provide the client 30 with a wide variety of security functions or services. In one embodiment of the invention, the security processor 40 provides processing power for encryption/decryption tasks that are computationally intensive. For example, encrypted digital content received via the network interface 42 may be decrypted by the encryption/decryption engine 50, in real time, before being provided to the display subsystem (not shown) for display to a user. Accordingly, in various embodiments of the invention, the security processor 40 may have any number of secret keys in addition to the encryption/decryption key 72, and each key may serve a different purpose.

Figure 4:
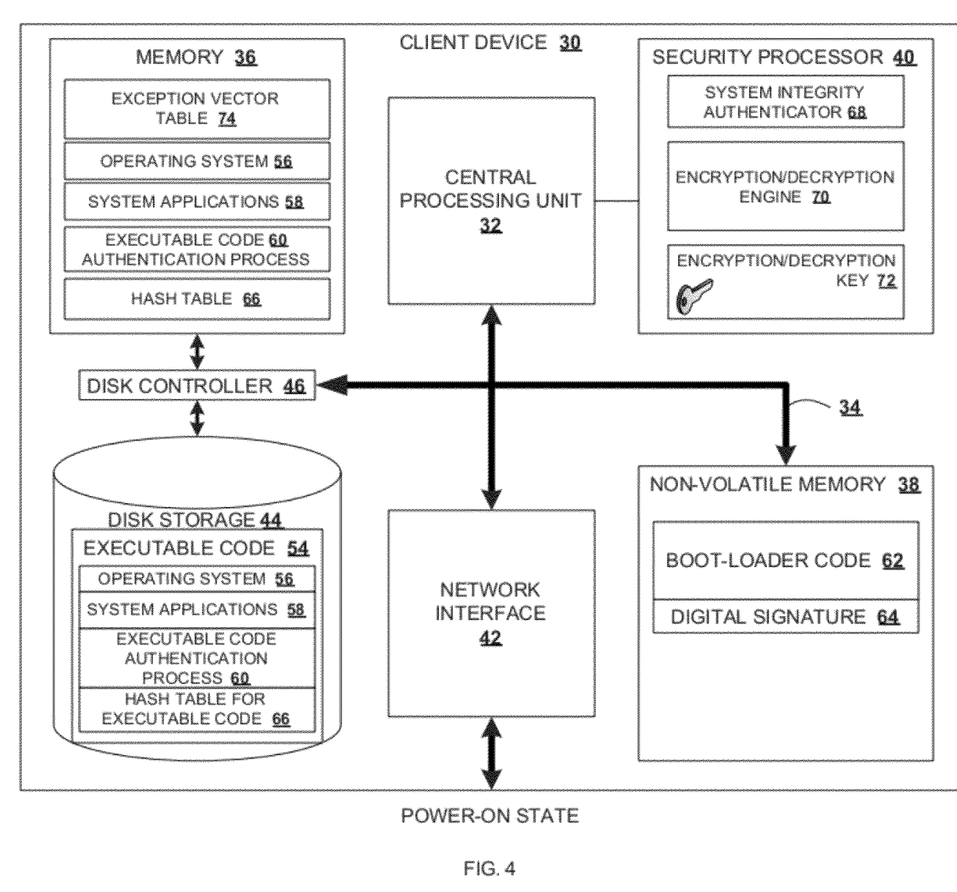
FIG. 4 illustrates a client device in a power-on state, according to one embodiment of the invention.

FIG. 4 illustrates a client device 30 in a power-on state, according to one embodiment of the invention. The client device 30 is designed such that, when it is initially powered on, the CPU is held in the RESET state, and prevented from operating. Accordingly, at power-on, the security processor 40 is enabled. Specifically, the system integrity authenticator 68 is enabled to perform an authentication operation on the boot-loader code 62. In one embodiment of the invention, the system integrity authenticator 68 authenticates the boot-loader code by comparing a first hash, generated during the power-on procedure, with a second hash, generated during production and programmed into the non-volatile memory after being encrypted with an encryption key For example, the system integrity authenticator 68 generates a hash value for the boot-loader code by analyzing the boot-loader code 62 in the non-volatile memory 38. In addition, the system integrity authenticator 68 reads the boot-loader code digital signature 64. After reading the digital signature 64, the system integrity authenticator 68 utilizes the encryption/decryption key 72 to decrypt the digital signature 64, resulting in the original hash value for the boot-loader code 62 that was generated at the production server. If the two hash values match, it is presumed that the boot-loader code 62 has not been tampered with or changed since being programmed into the non-volatile memory during production. Accordingly, the security processor 40 then enables the CPU to access the boot-loader code 62, and begin the boot-up procedure.

During the boot-up procedure, the operating system 56, or a portion thereof, is loaded into the memory 36 in accordance with the boot-loader instructions 62. In addition, an exception vector table 74 is generated and loaded into the memory 36, along with system applications 58, or a portion of, the executable code authentication process 60 and the hash table 66. Before loading the operating system and the application code, the boot loader also verifies that those files are authentic by checking their signatures.

In one embodiment of the invention, the exception vector table 74 causes the CPU to switch contexts, and execute the executable code authentication process 60, when an exception event occurs. As described in connection with FIG. 2, when a particular exception event occurs, the exception vector table is referenced to determine the proper event handling routine to be executed to process the exception event. However, prior to processing the exception event, the exception vector table directs the CPU to execute the code authentication process. Because the operational "health" of the client is dependent upon the proper processing and handling of exception events, associating the code authentication process with the exception vector tables virtually guarantees that the code authentication process 60 will be executed. This ensures that a hacker is not able to disable, or otherwise render the code authentication process 60 inoperative.

In one embodiment of the invention, the code authentication process 60 generates a hash value for a segment of executable code in memory, and then compares the hash value with a pre-calculated hash value from the hash table for that particular segment of executable code. Assuming the hash values match, it is assumed that the executable code is authentic. However, if the hash values do not match, it is presumed that the executable code is not authentic. In one embodiment of the invention, when unauthentic code is discovered, the code authentication process may cause the client to halt executing all together. Additionally, or alternatively, the code authentication process 60 may report the discovery of unauthentic code to a server.

In one embodiment of the invention, the code authentication process may maintain status information indicating which segments of code have been authenticated, as well as information relating to the time at which segments were authenticated. Accordingly, the code authentication process 60 may control how frequently it operates by determining whether executable code in memory 36 needs to be authenticated based on the status information it maintains. For example, if all of the executable code in memory 36 has recently been authenticated, the code authentication process 60 may not operate, thereby passing control to the exception handling routine associated with the exception event that initially triggered the execution of the code authentication process 60. Or, if the code authentication process has consumed too much CPU recently, it may decide not to check and just pass control onto the event handler.

In one embodiment of the invention, in addition to authenticating the boot-loader code at boot-up time, the system integrity authenticator 68 of the security processor 40 systematically authenticates the exception vector table, code authentication process 60 and the hash table 66. For example, the system integrity authenticator 68 may generate a hash value based on the hash table, and compare that hash value to a previously generated hash value. The previously generated hash value for the hash table may be a special hash value that is stored in the non-volatile memory, or in the security processor. In this manner, the system integrity authenticator can verify the authenticity of the hash table that is used to authenticate the executable code. Similarly, the system integrity authenticator may authenticate the code for the code authentication process 60, or the exception vector table 74.

Although the hash table 66 is shown in FIGS. 3 and 4 to reside on the disk storage 44, it will be appreciated by those skilled in the art that the hash table 66 may be programmed into the non-volatile memory 38. Alternatively, the hash table 66 may reside in a portion of memory (not shown) in the security processor. In addition, the hash table 66 may be encrypted with an encryption key (e.g., such as encryption key 72), such that the security processor is to decrypt the hash table prior to it being used by the code authentication process 60.

Figure 5:
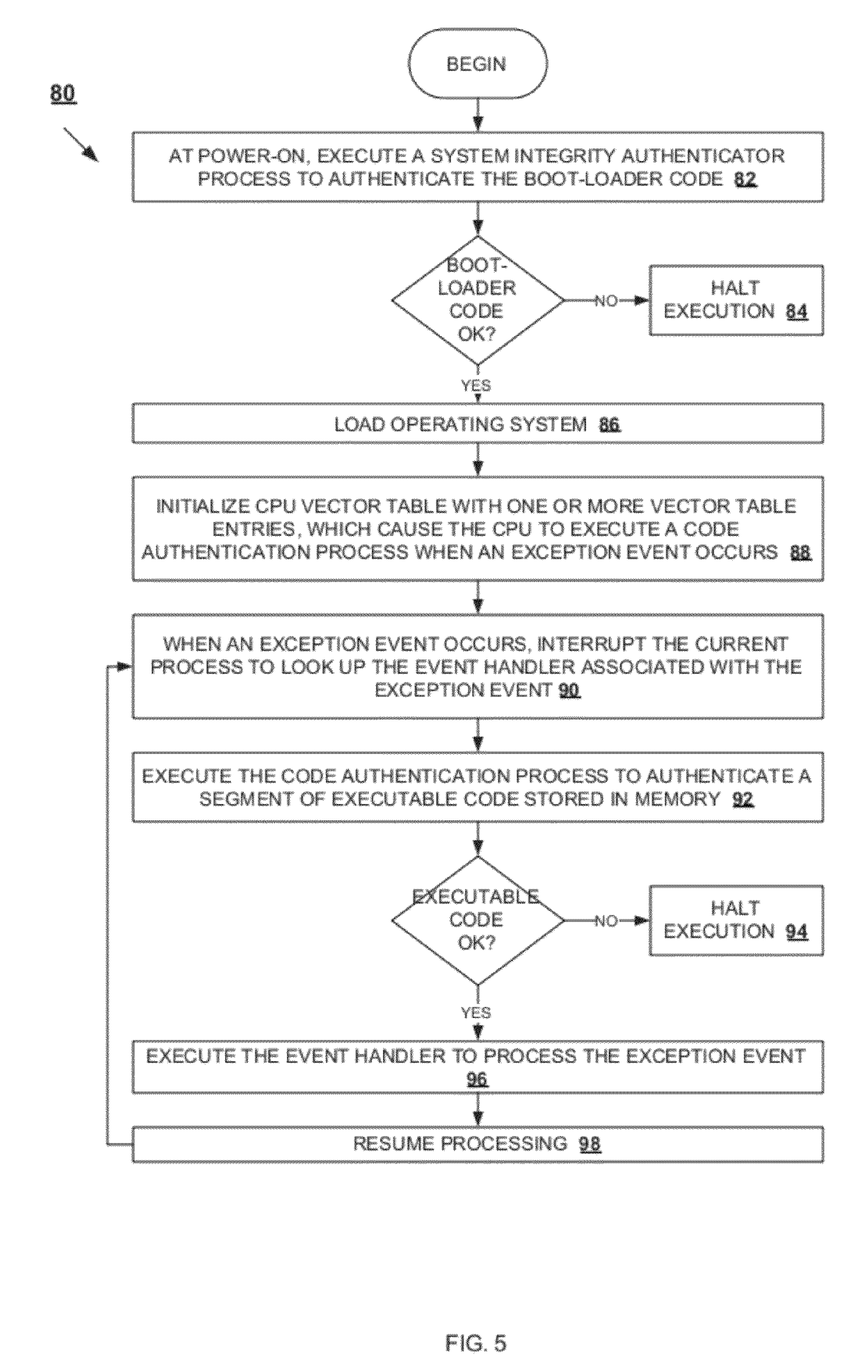
FIG. 5 illustrates a method, according to an embodiment of the invention, for protecting against the execution of unauthorized software.

FIG. 5 illustrates a method 80, according to an embodiment of the invention, for protecting against the execution of unauthorized code on a client device. At operation 82, the client device 30 is powered on, and the system integrity authenticator 82 performs an authentication operation to authenticate the boot-loader code 62. For example, the system integrity authenticator 68 may verify that a hash generated based on the boot-loader code stored in memory 38 is consistent with a digital signature 64 for the boot-loader code 62. If the boot-loader code 62 is determined not to be authentic, then the client halts execution 84, and does not boot-up. However, if the boot-loader code checks out as authentic, then at operation 86, the client loads the operating system into memory according to the instructions of the boot-loader code 62.

During the boot-up procedure, boot loader transfers control to the kernel of the operating system, and the operating system boot-up proceeds. At operation 88, the client initializes a CPU vector table with one or more vector table entries, which cause the CPU to execute a code authentication process when an exception event occurs, prior to executing the operating system's exception handling routine associated with the exception event. Accordingly, at operation 90, when an exception event occurs, the CPU interrupts the current process to lookup the event handling routine associated with the exception event. At operation 92, the code authentication process is executed to authenticate a segment of executable code in memory. If the executable code is not authentic, the client halts execution at operation 94. However, if the executable code is authentic, then the event handling routine for the exception event is executed at operation 96, after which the normal activities of the operating system including execution of the application code resume in block 98.

Figure 6:
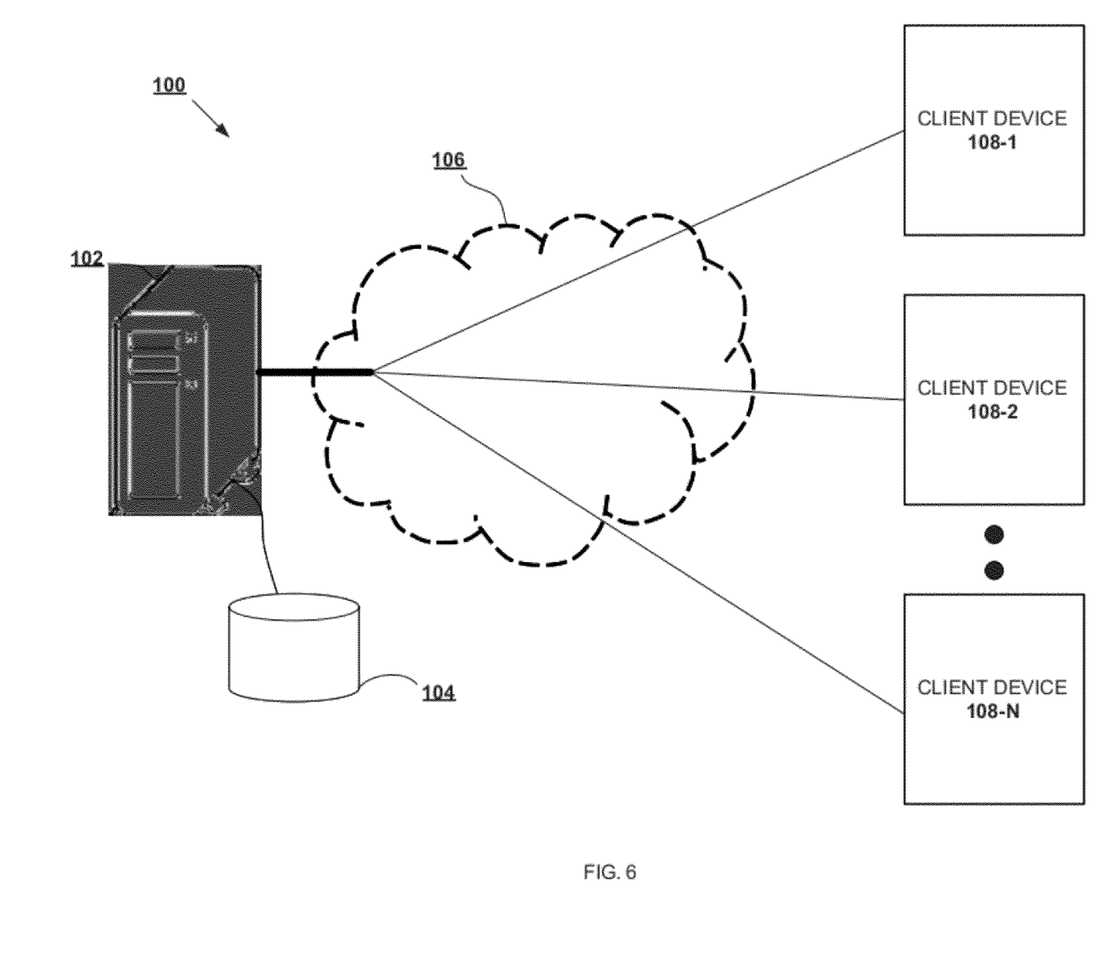
FIG. 6 illustrates a client-server based digital content delivery system, in which a client device according to an embodiment of the invention may be utilized.

FIG. 6 illustrates a client-server based digital content delivery system 100, in which a client device 108 according to an embodiment of the invention may be utilized. The digital content delivery system 100 of FIG. 1 includes a digital content server 102 with a mass storage device 104 for storing digital content. The digital content server 102 is coupled by means of a network 106 to multiple client devices 108-1, 108-2 and 108-n. In operation, a particular client device 108-1 may communicate a request for a particular title (e.g., movie), or other digital content, to the content server 102. In response, the content server 102 reads the digital content from the mass storage device 104, encrypts the digital content with an encryption key, and then communicates the digital content over the network 106 to the requesting client device 108-1. Upon receiving the encrypted digital content, the client device 108-1 executes a procedure for decrypting the digital content and then displaying the digital content to the user.

Figure 7:
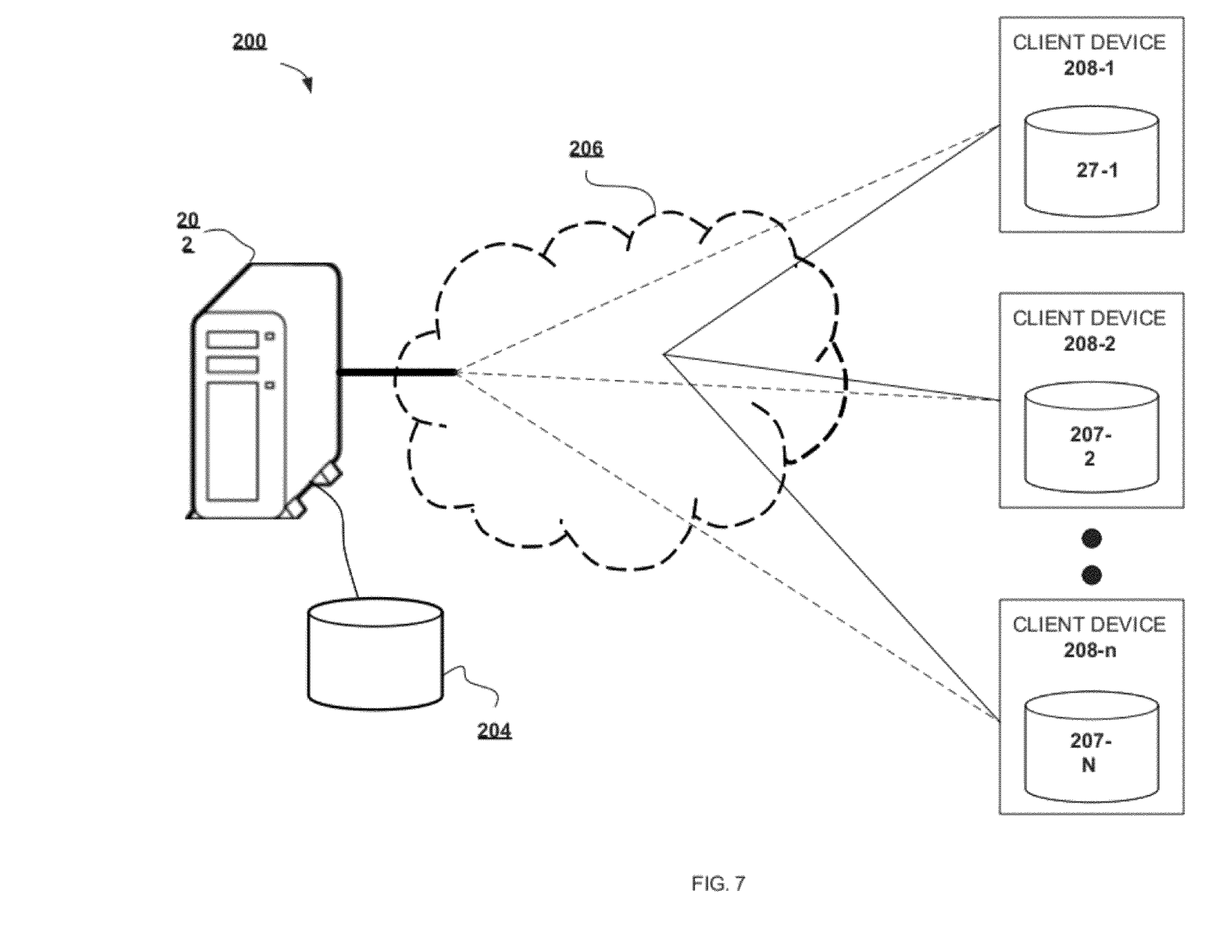
FIG. 7 illustrates a distributed peer-to-peer digital content delivery system, in which a client device according to an embodiment of the invention may be utilized.

FIG. 7 illustrates a distributed digital content delivery system 200, in which a client device according to an embodiment of the invention may be utilized. In contrast to the client-server based system 100 of FIG. 1, the system of FIG. 2 is a distributed system. For example, the digital content is stored not only on the mass storage device 204 of the content server 202, but also on the storage devices 207-1, 207-2 and 207-n of each individual client device 208-1, 208-2 and 208-N. Consequently, when a particular client device 208-1 makes a request for a particular title, the digital content server 202 manages the delivery process, but the actual data is communicated to the requesting client 208-1 over the network 206 from other client devices (e.g., client devices 208-2 through 208-N). This distributed delivery system, which may be thought of as a hybrid of a client-server and peer-to-peer delivery system, is more completely described in U.S. patent application Ser. No. 11/269,462 filed on Nov. 7, 2005, and assigned to VVOND, Inc.

The content delivery systems illustrated in FIG. 6 and FIG. 7 are provided as two examples of systems in which the client device, according to an embodiment of the invention, may be utilized. However, it will be appreciated by those skilled in the art that the present invention may be applicable to a wide variety of client devices and content delivery systems in addition to those illustrated in FIG. 6 and FIG. 7. Furthermore, consistent with the invention, the client device may be implemented in one of many possible form factors, including (but not limited to): a set-top box, a handheld player, a mobile phone, a personal digital assistant, or a game playing device.

Thus, a method and system for protecting against the execution of unauthorized software on a client device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is being claimed is:

1. A method for providing security on a client device, the method being performed by one or more processors and comprising:
   initializing an exception vector table, the exception vector table including one or more vector table entries that each references a corresponding event handling routine that is used to process a corresponding exception event, wherein at least one vector table entry causes a code authentication process to be executed before a corresponding event handling routine is executed;
   in response to detecting an exception event associated with at least one vector table entry, executing the code authentication process to authenticate a portion of executable code stored in a memory resource, the code authentication process determining whether the portion of executable code is authorized; and
   in response to the code authentication process determining that the portion of executable code is authorized, executing an event handling routine corresponding to the at least one vector table entry.

2. The method of claim 1, further comprising in response to the code authentication process determining that the portion of executable code is unauthorized, preventing the execution of the event handling routine corresponding to the at least one vector table entry.

3. The method of claim 2, further comprising in response to the code authentication process determining that the portion of executable code is not authorized, transmitting information about the determined unauthorized portion of executable code to a server over a network.

4. The method of claim 1, further comprising maintaining status information indicating which portions of executable code have been authenticated by the code authentication process and when portions of executable code have been authenticated by the code authentication process.

5. The method of claim 4, wherein the code authentication process is executed to authenticate the portion of executable code based, at least in part, on the maintained status information.

6. The method of claim 1, further comprising during a power-on procedure, (i) executing a system integrity authenticator to authenticate boot-loader code stored in a non-volatile memory resource, and (ii) in response to the system integrity authenticator determining that the boot-loader code is authorized, loading a portion of the operating system into the memory resource by executing the boot-loader code.

7. The method of claim 6, wherein the exception vector table is initialized in response to executing the boot-loader code.

8. The method of claim 6, wherein the system integrity authenticator also authenticates at least one of code corresponding the exception vector table or code corresponding to the code authentication process.

9. A client device comprising:
   one or more memory resources; and
   one or more processing resources coupled to the one or more memory resources, the one or more processing resources configured to:
   initialize an exception vector table, the exception vector table including one or more vector table entries that each references a corresponding event handling routine that is used to process a corresponding exception event, wherein at least one vector table entry causes a code authentication process to be executed before a corresponding event handling routine is executed;
   in response to detecting an exception event associated with at least one vector table entry, execute the code authentication process to authenticate a portion of executable code stored in the one or more memory resources, the code authentication process determining whether the portion of executable code is authorized; and
   in response to the code authentication process determining that the portion of executable code is authorized, execute an event handling routine corresponding to the at least one vector table entry.

10. The method of claim 9, wherein the one or more processors are further configured to, in response to the code authentication process determining that the portion of executable code is unauthorized, prevent the execution of the event handling routine corresponding to the at least one vector table entry.

11. The method of claim 10, wherein the one or more processors are further configured to, in response to the code authentication process determining that the portion of executable code is not authorized, transmit information about the determined unauthorized portion of executable code to a server over a network.

12. The method of claim 9, wherein the one or more processors are further configured to maintain status information indicating which portions of executable code have been authenticated by the code authentication process and when portions of executable code have been authenticated by the code authentication process.

13. The method of claim 12, wherein the one or more processors execute the code authentication process based, at least in part, on the maintained status information.

14. The method of claim 9, wherein the one or more processors are further configured to, during a power-on procedure, (i) execute a system integrity authenticator to authenticate boot-loader code stored in a non-volatile memory resource, and (ii) in response to the system integrity authenticator determining that the boot-loader code is authorized, load a portion of the operating system into the one or more memory resources by executing the boot-loader code.

15. The method of claim 14, wherein the one or more processing resources initialize the exception vector table in response to executing the boot-loader code.

16. The method of claim 14, wherein the system integrity authenticator also authenticates at least one of code corresponding the exception vector table or code corresponding to the code authentication process.

17. A non-transitory computer readable medium storing instructions that, when executed by one or more processors, causes the one or more processors to perform steps comprising:

initializing an exception vector table, the exception vector table including one or more vector table entries that each references a corresponding event handling routine that is used to process a corresponding exception event, wherein at least one vector table entry causes a code authentication process to be executed before a corresponding event handling routine is executed;

in response to detecting an exception event associated with at least one vector table entry, executing the code authentication process to authenticate a portion of executable code stored in a memory resource, the code authentication process determining whether the portion of executable code is authorized; and     in response to the code authentication process determining that the portion of executable code is authorized, executing an event handling routine corresponding to the at least one vector table entry.

18. The non-transitory computer readable medium of claim 17, further storing instructions that cause the one or more processors to, in response to the code authentication process determining that the portion of executable code is not authorized, (i) prevent the execution of the event handling routine corresponding to the at least one vector table entry, and (ii) transmit information about the determined unauthorized portion of executable code to a server over a network.

19. The non-transitory computer readable medium of claim 17, further storing instructions that cause the one or more processors to maintain status information indicating which portions of executable code have been authenticated by the code authentication process and when portions of executable code have been authenticated by the code authentication process.

20. The non-transitory computer readable medium of claim 19, further storing instructions that cause the one or more processors to execute the code authentication process based, at least in part, on the maintained status information.

\* \* \* \* \*